Feb. 7, 1928.　　　　　　　　　　　　　　　1,658,076
A. V. DA COSTA
FLUID MOTOR
Filed Dec. 1, 1922　　　　7 Sheets-Sheet 1

Inventor
Arthur V. DaCosta
By Howard E. Barlow
Attorney

Feb. 7, 1928.

A. V. DA COSTA 1,658,076

FLUID MOTOR

Filed Dec. 1, 1922

Inventor
Arthur V. DaCosta
By Howard E. Barlow
Attorney

Feb. 7, 1928.

A. V. DA COSTA 1,658,076

FLUID MOTOR

Filed Dec. 1, 1922

Inventor
Arthur V. DaCosta
By Howard E. Barlow
Attorney

Feb. 7, 1928.
A. V. DA COSTA
1,658,076
FLUID MOTOR
Filed Dec. 1, 1922
7 Sheets-Sheet 6
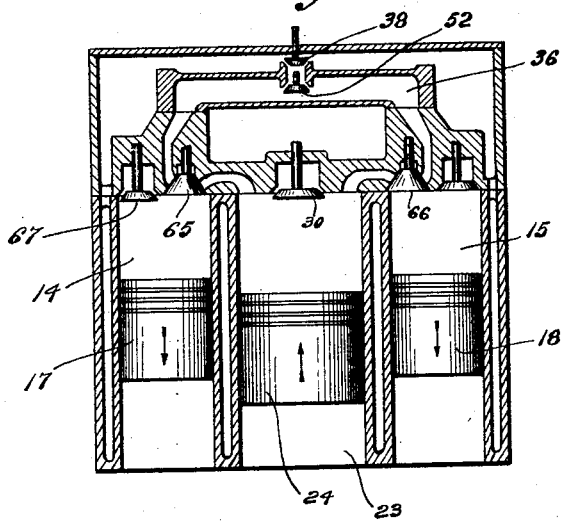
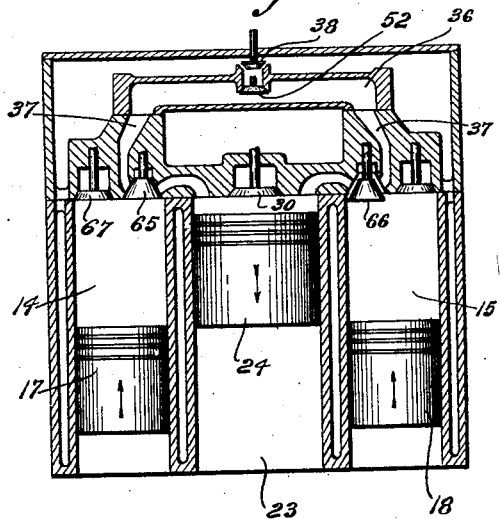 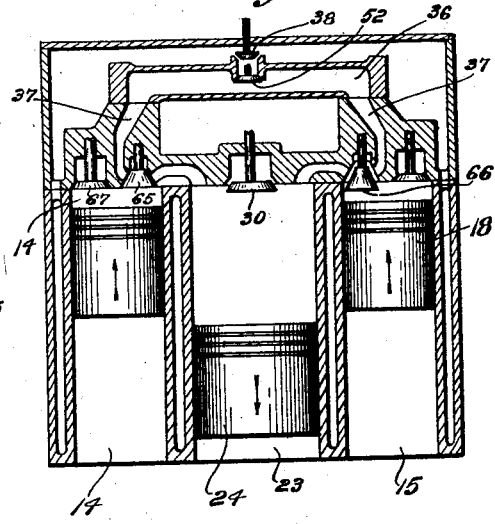
Inventor
Arthur V. DaCosta
By Howard E Barlow
Attorney Feb. 7, 1928.
A. V. DA COSTA
1,658,076
FLUID MOTOR
Filed Dec. 1, 1922
7 Sheets-Sheet 7
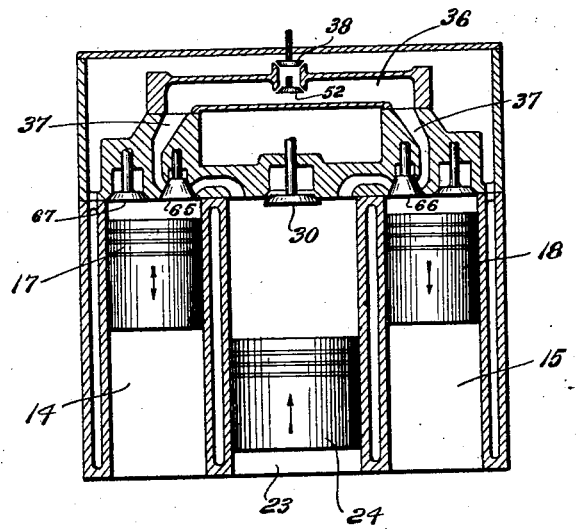
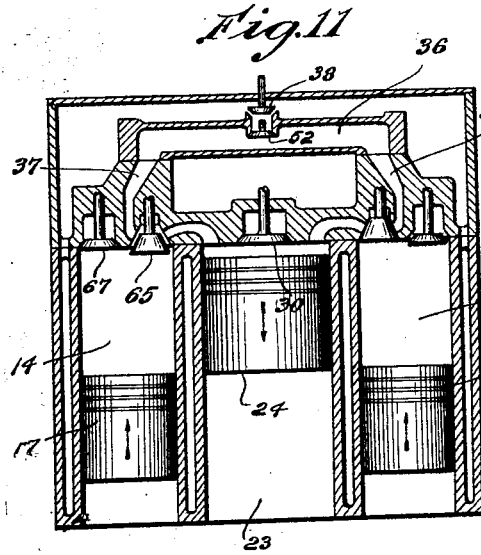
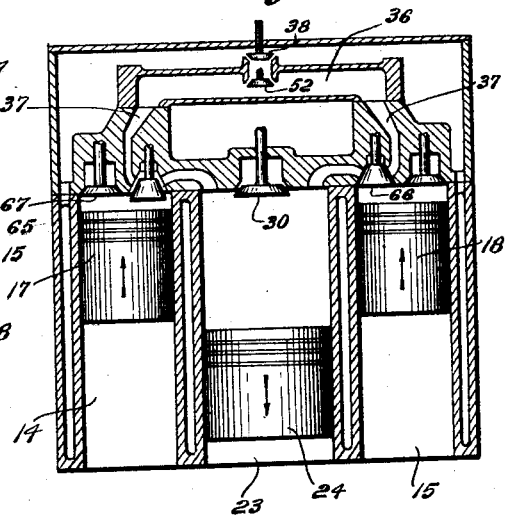
Inventor
Arthur V. DaCosta
By Howard E. Barlow
Attorney Patented Feb. 7, 1928.

1,658,076

UNITED STATES PATENT OFFICE.

ARTHUR V. DA COSTA, OF PROVIDENCE, RHODE ISLAND.

FLUID MOTOR.

Application filed December 1, 1922. Serial No. 604,187.

This invention relates to new and improved construction of engine or motor and an improved method of generating power therein, which construction and method is an improvement over my prior Patent Number 1,433,185, and the object of my present invention is to provide an engine of this character having one or more internal combustion cylinders in which a charge of combustible fluid is compressed, fired and expanded to drive a piston, the heat from this exploded charge being caused to generate a pressure of steam, a portion of which is admitted to the combustion cylinder to cooperate with and increase the efficiency of the next explosive charge.

This invention further consists in the provision of means whereby high pressure steam upon being admitted to the internal combustion cylinder is caused to scavenge the same, that is, to assist in driving out the burnt gases to prevent them from adulterating and so unduly reduce the effectiveness of the next explosive charge.

A still further object of the invention is the provision of means whereby a portion of this steam pressure which has entered the combustion cylinder is trapped or retained therein to obtain among others the following results; first, to assist in driving its piston part way down on its suction stroke; second, to be condensed by the admission of the next cool explosive charge creating a partial vacuum to assist the mechanical suction to draw in a greater volume of explosive mixture; third, to cool the charge in the cylinder on the compression stroke and to permit a much higher compression without preignition, than could be obtained without the admixture of this steam; fourth, when explosion now takes place this steam upon being subjected to the high degree of heat becomes superheated thus increasing its volume and mean effective pressure to assist in driving its piston; and fifth, the steam in the cylinder serves to cool its walls sufficiently to prevent the film of lubricating oil deposited thereon from becoming charred and destroyed thus again prolonging the life of the engine. From the above it will be seen that this steam when admitted and retained in the cylinder during a cycle of operations functions in a number of distinct ways and cooperates with the explosive charge to increase the efficiency of the engine.

A further object of the invention is to transfer the exhaust gases mixed with more steam under pressure into a second low pressure cylinder to drive its piston and by so doing utilize practically all of the heat which has heretofore been wasted in the internal combustion engine thereby combining the internal combustion engine and the steam engine to function harmoniously as a single unit and by such a combination and my improved method of using the steam more nearly obtain the maximum power from a given quantity of fuel.

A further object of this invention is the provision of a superheating steam chamber in which the steam is raised to a higher temperature and then conducted to another cylinder to drive a piston therein.

A still further object of the invention is the provision of means whereby a transfer valve in the internal combustion cylinder is caused to be acted upon by the steam to prevent the same from over-heating.

This invention further consists in the provision of means for passing water first through a pre-heating coil in the exhaust pipe to take up the heat of the exhaust and then conducting this water into the cylinder jackets where it is again heated by the heat transmitted through the walls of the combustion cylinder and finally raised to steam in the upper generating chamber and is then passed into the superheating chamber where it is acted upon directly by the fiery exhaust gases and finally caused to assist in driving the pistons both in the low and in the high pressure cylinders.

My invention further consists in the provision of means for automatically controlling the amount of water which shall flow to the steam generator to supply the same as used.

With these and other objects in view, the invention consists of certain novel features of construction, as will be more fully described, and particularly pointed out in the appended claims.

In the accompanying drawings:

Figures 7, 8, 9, 10, 11 and 12 show various positions of the valves for controlling the flow of the gases including the steam and explosion charges to the cylinders when the pistons are in different positions therein.

Figure 1:
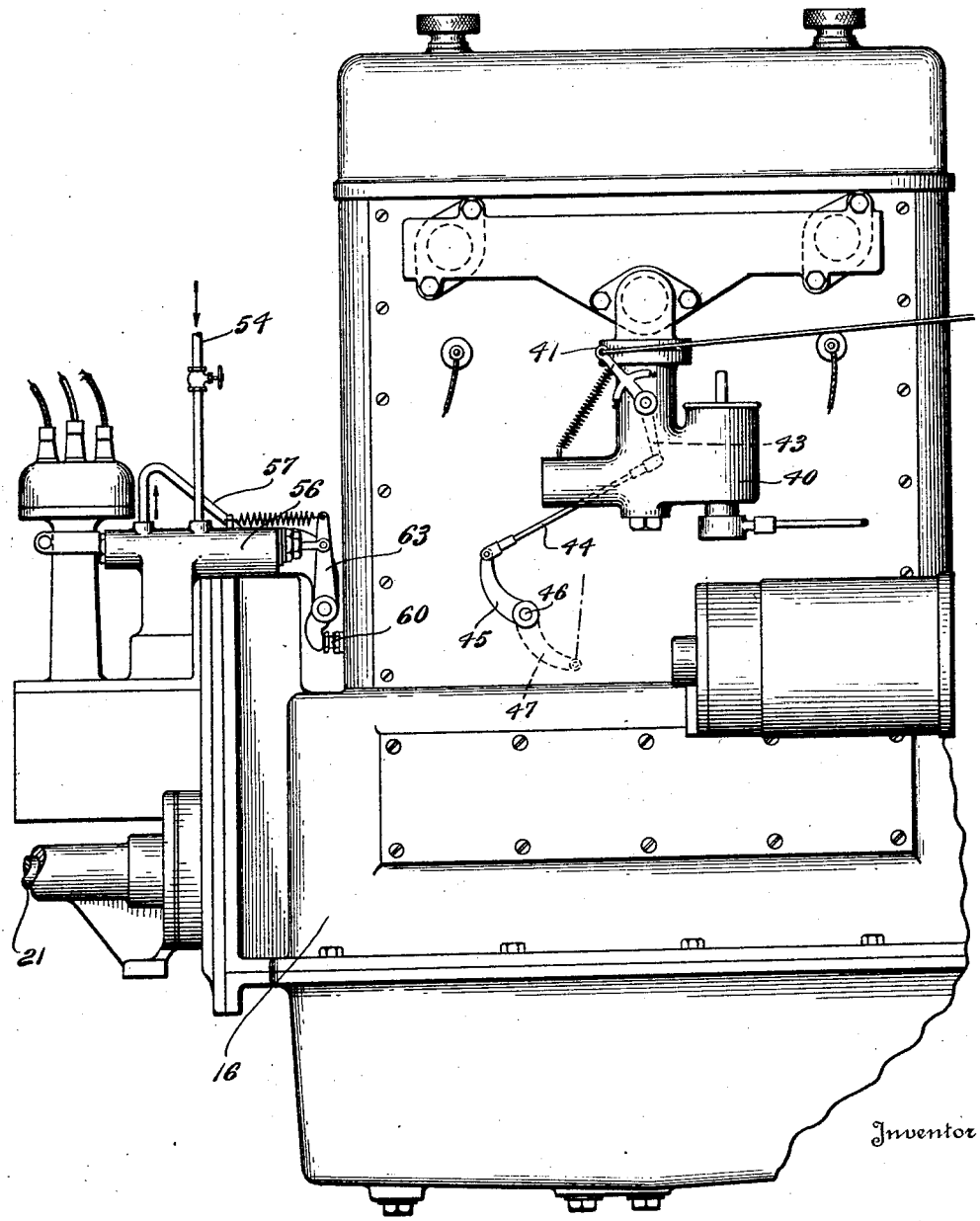
Figure 1 is a side elevation showing one side of the engine.
Figure 2:
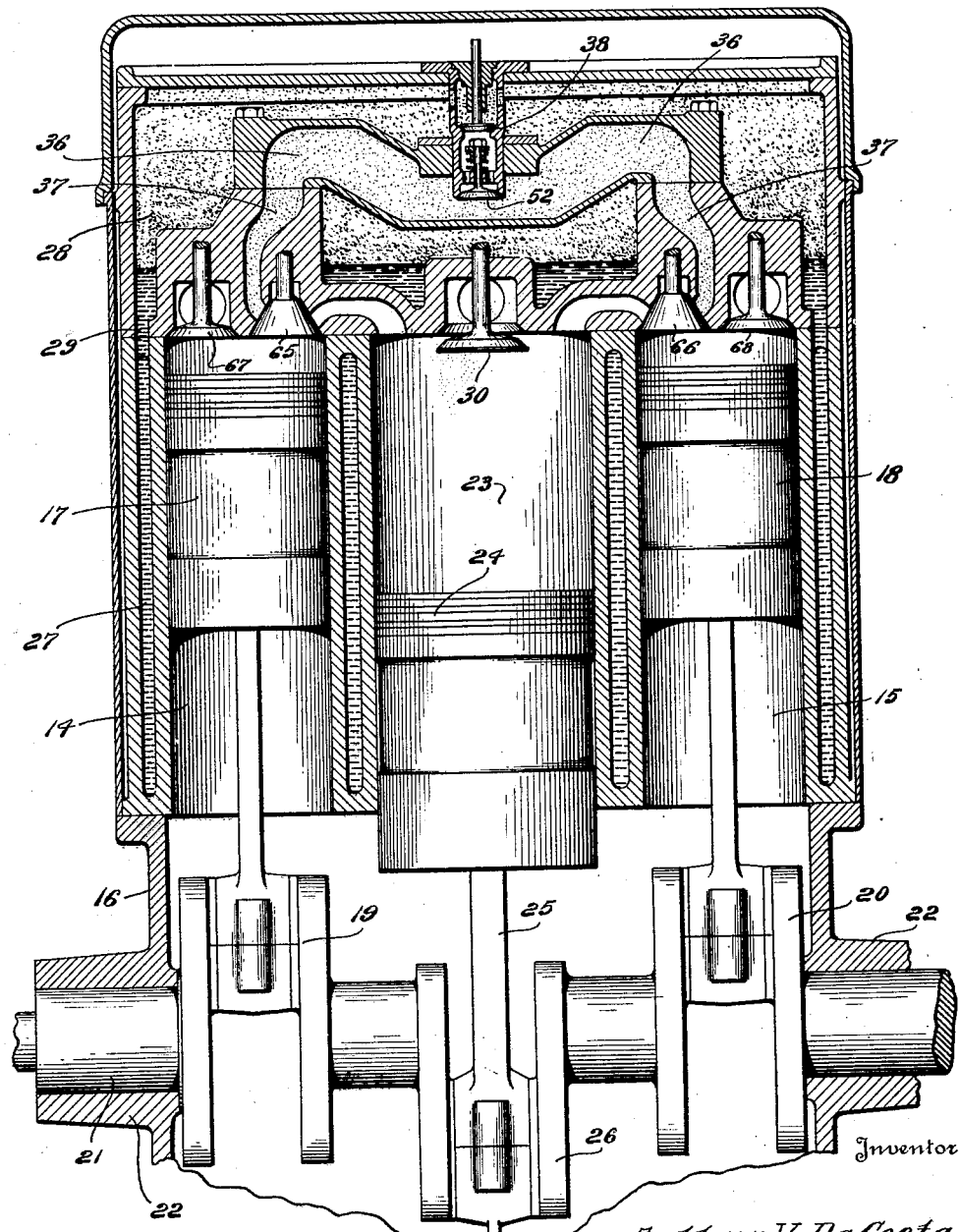
Figure 2 is a longitudinal sectional side elevation of the engine through the cylinders and the steam generating spaces.

It is found in practice to be of great advantage to be able to combine an internal combustion engine and a steam engine whereby the heretofore wasted heat in the combustion engine is utilized to generate steam to drive the pistons of the steam engine and to so couple these two power generating units that they will cooperate with each other and work together as a single unit, thereby greatly increasing the efficiency over that which has heretofore been obtained by either the steam or the internal combustion engine when operated separately.

In accomplishing the above object, I form a water jacket about the cylinders and provide a steam generator chamber at their upper ends, and I also preferably provide a superheating chamber and locate the same in said generator with a valve for admitting steam to the chamber when the pressure therein is less than that in the generator, and in order to superheat and quickly raise the temperature of the steam in the superheater, I provide means for injecting a portion of the exploded charge directly into the steam in this chamber and alternately into opposite portions or different parts thereof where a plurality of combustion cylinders are employed, and when the pressure thus raised by the injected gases becomes greater than that in the exhausting combustion cylinder the steam then flows back and cooperates with the balance of the burning charge to actuate the piston in a second or low pressure cylinder.

By my arrangement of ports and valves the high pressure steam from the superheating chamber acts upon the control or transfer valves to prevent them from being destroyed by becoming overheated; also a portion of this steam on its way from the chamber to the low pressure cylinder passes into the combustion cylinder to scavenge this cylinder and cooperate with the combustion charge to materially increase the power and efficiency of the engine, either when operated as a single unit or as a compound motor, and the following is a detailed description of one arrangement of mechanism by which these most advantageous results are obtained:—

With reference to the drawings, 14 and 15 designate a pair of high pressure internal combustion cylinders which are mounted upon a common base 16. In these cylinders are mounted pistons 17 and 18 respectively, which are connected to their respective cranks 19 and 20 which are in turn connected to the main drive shaft 21 mounted in bearings 22 in the casing 16. Intermediate this pair of high pressure combustion cylinders, I have mounted a single low pressure cylinder 23, in which is mounted a piston 24 connected by means of a rod 25 to the crank 26, which latter is also connected to the crank shaft 21 and which has a throw greater than that of the high pressure cylinder cranks.

All of these cylinders are surrounded by a water jacket 27 and on their upper ends I have mounted a hollow member 28 which serves as a head for all of these cylinders and is constructed in the form of a chamber arranged to communicate through the passageway 29 with the water jacket 27 and is adapted to carry a comparatively small amount of water or steam and also serve in connection with the water jacket as a steam generator.

Figure 4:
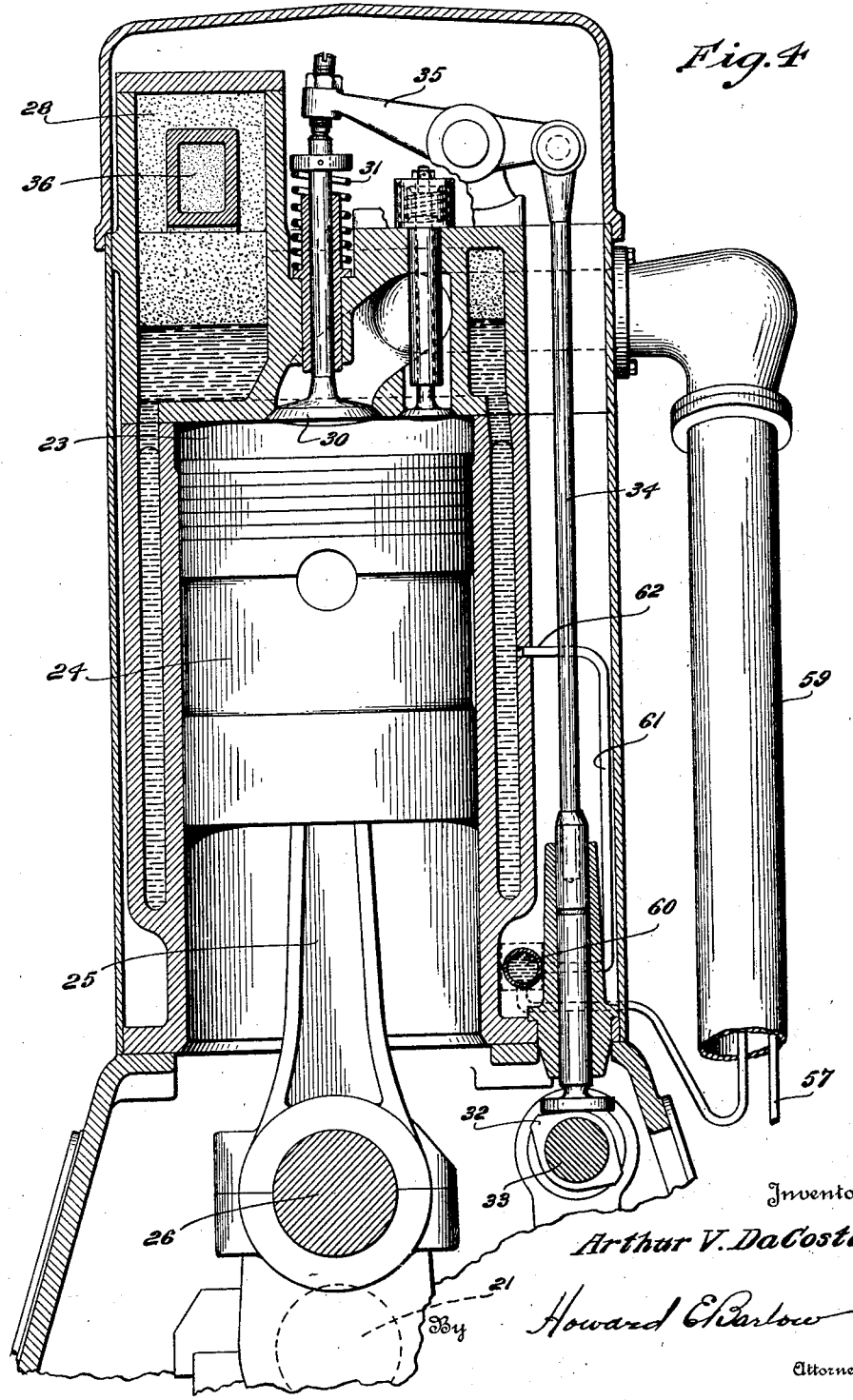
Figure 4 is a transverse section through the low pressure cylinder and showing the exhaust valve controlling mechanism for the same.
Figure 5:
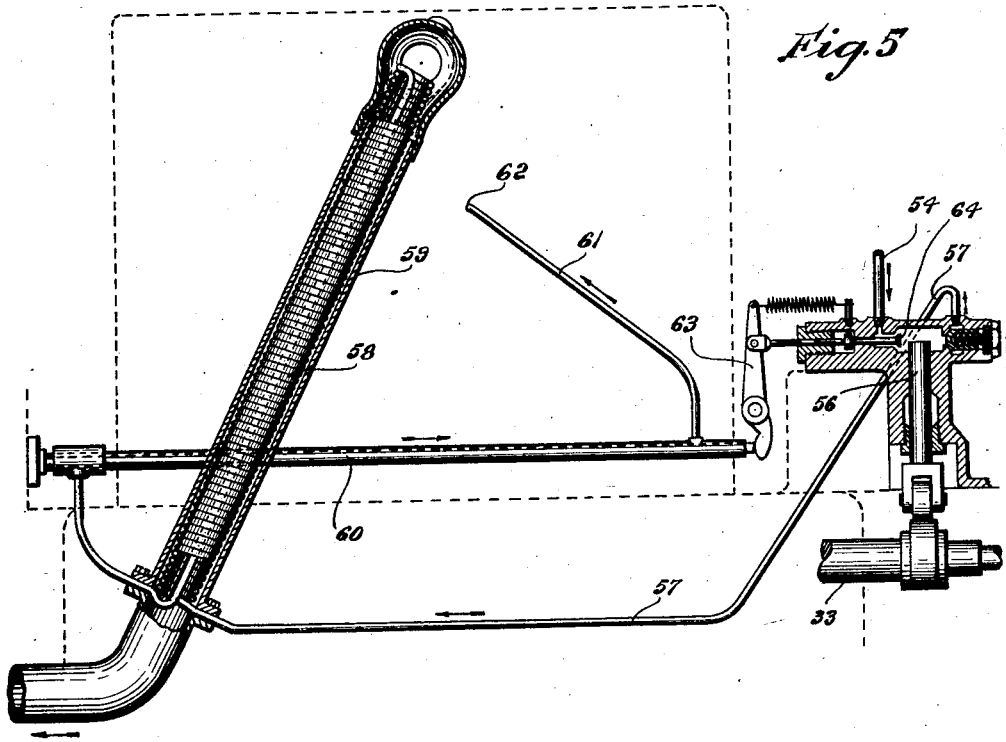
Figure 5 is a view showing the parts partly in section and illustrating the water pump and pipe connections by which the water is forced through a pre-heating coil in the exhaust pipe and thence through the automatic supply control into the water jackets of the engine.
Figure 6:
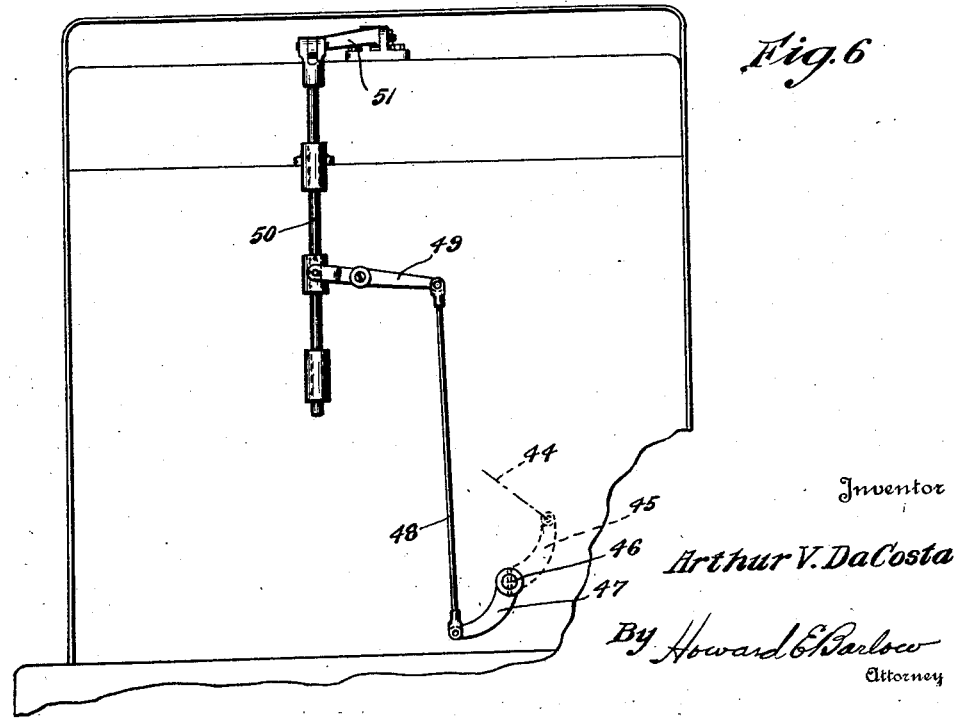
Figure 6 is a view showing the outline of the engine taken from the opposite side from that shown in Figure 1, and illustrating the operating connection from the carburetor to the steam throttle valve to the superheating chamber.

This head, in addition to serving as a steam generating chamber, also serves as a valve head for carrying all of the intake and exhaust valves for all the cylinders and each of these valves is mounted to operate similarily to the low pressure exhaust valve 30, shown in Figure 4, and each is held to its seat by means of a spring shown at 31, and each is operated independently through a cam as at 32, connecting rod 34, and rocker arm 35 all from a common shaft 33 which shaft is driven in time with the crank shaft in the usual way (not shown).

Figure 3:
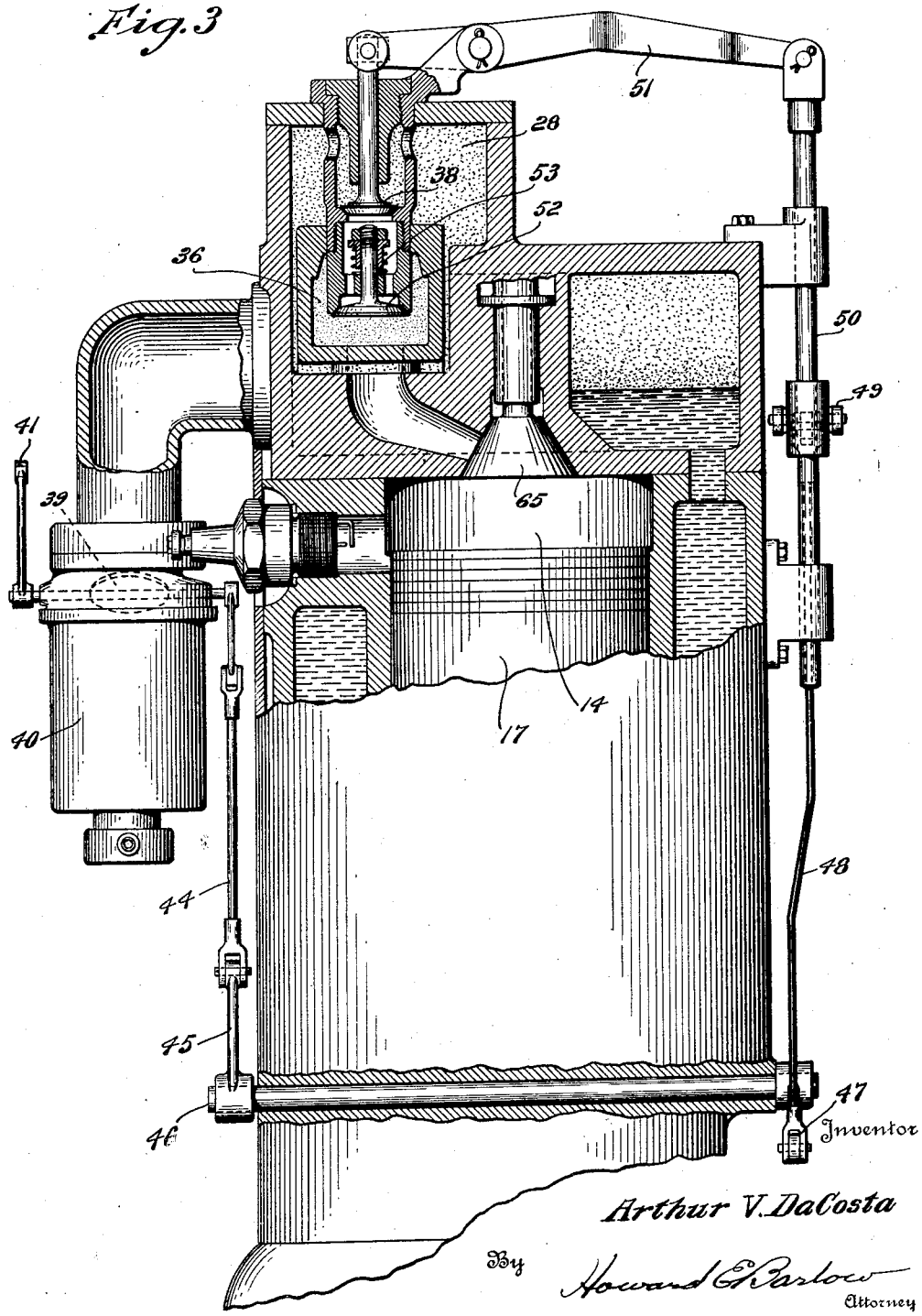
Figure 3 is a transverse elevation partly in section through one of the internal combustion cylinders and showing the superheating chamber as mechanically connected to the carburetor throttle.

In this generating head, I have mounted a so-called steam superheating chamber 36 which is connected at its opposite ends through passageways 37 to the respective combustion cylinders 14 and 15, and in order to control the flow of steam from the generator head into this superheating chamber, I have provided a steam throttle valve 38 see Figure 3, which is arranged to be operated in unison with the throttle valve 39 in the carburetor 40, whereby the opening or closing movement of the carburetor lever 41 is arranged to act through lever 43, connecting rod 44, lever 45, rock shaft 46, lever 47, connection 48, lever 49, lift rod 50, and lever 51 to operate this steam throttle valve with the carburetor valve so that when the engine is slowed down quickly by shutting off the supply of gas, the steam from the generator will not flood the super-heater and the cylinders.

I have also provided an automatically actuated control valve 52 to work independently of the throttle valve 38 and which is normally held to its seat by spring 53, whereby when pressure in the chamber 36 becomes less than that in the generator 28 being drawn therefrom by action of the cylinders, this control valve 52 will automatically open and permit a fresh supply of steam to flow into this chamber, and as soon as the pressure is again built up in this chamber to a point equal to or above that in the outer generator by direct action of the heat in the combustion chamber the valve will close automatically and prevent the internal pressure from passing into the outer chamber.

Water to the cylinder jacket is supplied through feed pipe 54 to a plunger pump 56 by which it is forced out through feed pipe 57, up through the preheating coil 58 which is located in the exhaust pipe 59, and then back through the center of this coil and into a thermal control pipe 60 and up through a pipe 61 into the cylinder jackets at the points 62.

In order to control the action of the pump and the amount of water that shall be fed to the cylinders, I have herein shown the pipe 60 as serving to operate as a thermostat for automatically controlling the effective action of the pump, whereby when the water becomes hot in the thermostat it will expand endways and act through lever 63 to close the valve 64 and so permit more water to be forced by action of the continuously running pump through the feed tube 57, but I do not wish to be restricted to this particular type of automatic feed control as any other suitable control device may be employed without departing from the spirit and scope of my invention.

It will be noted, however, that cold water first enters the pre-heating coil at the end farthest from the engine and works its way to the hottest end from where it is discharged into the jacket through the automatic feed control.

The water entering the jacket from the pre-heater has been raised to the boiling temperature and may even at times be admitted as saturated steam. The level of the water in the jacket should by a properly acting water feed control be such as to just cover the top of the cylinders, and above this level is a strata of saturated steam and then above this is dry steam which latter surrounds the superheating manifold 36. After passing this steam in a dry state into this superheating chamber it becomes highly super-heated by injecting a portion of the exhausting fiery charge thereinto, which charge becomes thoroughly mixed with the steam therein after which this compound charge is permitted to enter the cylinders.

The operation of my improved engine may be more fully explained as follows:—

The speed of the engine is controlled by a manual operation of the carburetor lever which is also controlled through the setting of the steam throttle valve 52.

The feed water as above described, is preheated before being passed into the cylinder jackets and here again it is raised to a pressure by further action of the radiating heat thereon; next it is passed into the superheating chamber 36 where it is raised to a high temperature and pressure by admitting a portion of the fiery exhaust charge thereinto through the transfer valves 65 and 66, from the internal combustion cylinders 14 and 15.

Assuming now, as illustrated in Figure 11, that a portion of this high pressure steam and admixture of gases has entered the superheating chamber in passing to the low pressure cylinder 23, the piston 17 in cylinder 14 has traversed a portion of its downward stroke under pressure of this expanding steam, as illustrated in Figure 7. This steam having now expended its force the intake valve 67 opens and admits a cool charge of combustible mixture which at once condenses the steam. The vacuum thereby created induces the gases from the carburetor manifold to more completely fill the cylinder with the explosive mixture than would be the case where the mechanical vacuum of the piston alone is employed. Thus it will be seen that the first portion of the suction stroke has been turned into a power stroke.

As illustrated in Figure 8, this piston has now reached the bottom of its intake or suction stroke, the valves 65 and 67 are closed and the cylinder is filled with a mixture of vaporized gas and air and minute particles of moisture from the condensed steam distributed throughout the cylinder.

The compression of the usual combustion cylinder is approximately 60 pounds and cannot be raised higher owing to the fact that the charge will pre-ignite, but by the use of steam in my charge it will be seen that the moisture of the condensed steam is now regenerated by the heat of compression and sufficient heat is thus absorbed from the walls of the cylinder and from the charge to permit the compression to be raised to about 160 pounds per square inch or over two and a half times that of ordinary compression and yet the temperature of the compound mixture is caused to remain safely below the pre-ignition point, which high compression is found in practice to materially increase the efficiency of an engine of the internal combustion type.

A charge in this cylinder is now fired with both valves closed as illustrated in Figure 9 and the charge in this cylinder 14 which contains high pressure steam and combustion gases now forces the piston downward and the steam which is highly super-heated in this chamber, serves to maintain by its expansive force a pressure higher than would ordinarily be maintained by the combustion gases alone and at the end of this power stroke with its compound incandescent gas is under approximately twice the pressure that would be obtained without the use of steam in the charge.

Besides increasing the pressure in the explosion cycle by the use of steam, I have at the same time succeeded in introducing a cooling medium which in reality does its work of internal cooling while adding its expansive force to that of the burning mixture, and by my improved method of utilizing the steam internally I maintain approximately a constant operating temperature in the motor, which temperature is substantially uniform both internally and externally of the cylinders.

In Figure 10 is illustrated the piston 17 starting downward on its power stroke and piston 18 starting downward on its suction stroke under pressure of the trapped steam which is being expanded herein by the heat of the cylinder walls and the lower pressure piston 24 just starting on its exhaust stroke with its exhaust valve 30 open.

When piston 17 has reached the bottom of its power stroke as illustrated in Figure 11, the low pressure piston 24 has reached the top of its exhaust stroke, its valve 30 is closed and it is compressing a portion of the remaining gases at the upper end thereof.

The expanded gases in cylinder 14 are now a fiery charge of high temperature and pressure and when the transfer valve 65 is open a portion of this gas rushes over into the low pressure cylinder to mix with and expand the compressed charge therein and a portion shoots up into the superheating chamber to superheat, mix with, compress and raise the pressure of the steam therein and when this pressure is raised to a point greater than that in the cylinder these mixed gases re-act and pass downwardly through the passageways 37 to cooperate with the charge being transferred from the combustion cylinder to also act upon the low pressure piston.

It will also be noted that the steam from this chamber acts upon the transfer valves 65 and 66 to cool them and so prevent the same from being destroyed which would be the case if these valves served to control the passage of the fiery charge alone, without being cooled by the action of the steam upon them.

As shown in Figure 12, the piston 17 is raised to the end of its transfer stroke, steam from the superheating chamber has previously been admitted to this cylinder during the latter half of that stroke and is caused to scavenge this cylinder by blowing the burnt charge therefrom over into the compound cylinder, and as the piston 17 nears the upper end of this stroke the exhaust valve 30 in the compound cylinder starts to open, at which time the gases are forced directly out through this valve into the open air as this transfer valve 65 now closes it traps a full charge of this steam at substantially boiler pressure in the combustion chamber portion of this cylinder 14: in other words, as this steam pressure which has entered this cylinder during the up stroke of its piston is blown over into the compound cylinder it carries the used charge with it and then after the exhaust valve 30 is opened this scavenged charge is blown out of this compound cylinder directly to the open air.

As is understood the cooperating cylinder 15 is performing a similar cycle of operations, transferring its burnt charge alternately with cylinder 14 into the low pressure cylinder 23. A portion of the exhaust fire from that cylinder is conducted into the opposite end of the superheating chamber to assist in superheating the steam therein.

According to the best authorities on internal combustion motors, it has been found that in practice when the motor is operating under a heavy load, the heat in the cylinder on the explosion stroke, is of such intensity as to burn or char the film of lubricating oil deposited on its walls and as the piston rises on its exhaust stroke over this oil-charred surface both the cylinder and the piston become worn which accounts in a great measure for the comparatively short life of such motors, as for instance, those used in flying machines, which are constantly working under a maximum load.

To obviate this deteriorating effect, I have found by practical experiments, that by injecting a quantity of steam into the internal combustion cylinder at the proper time, it serves to keep its walls sufficiently cool to prevent the film of oil from becoming charred and destroyed and so materially prolong the life of the engine.

I desire it to be understood that my present invention includes and covers the injection of a quantity of steam into the internal combustion cylinder to operate in the manner and perform the functions above described regardless of its subsequent action upon the next or so-called low pressure cylinder.

It will be seen by my improved construction of combined steam and internal combustion engine that the adjustment of the carburetor is the only manual operation for controlling the engine, all the other operations being automatic in their actions.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A method of generating power in a motor, which consists in exploding a combustible charge within a cylinder to move its piston, generating steam pressure by heat from the exploded charge, separating a portion of this steam from the rest and directing a portion of the exploded charge thereinto to raise its pressure, conducting said raised steam pressure into said cylinder and retaining a portion of this steam therein to cooperate with and increase the effectiveness of the next explosive charge therein.

2. A method of generating power in a motor, which consists in exploding a combustible charge within a cylinder to move its piston, generating steam pressure by radiated heat from the exploded charge, conducting a portion of said steam into a separate chamber, superheating this portion of the steam by directing a portion of the charge directly into it and admitting said superheated steam into said cylinder.

3. A method of generating power in a motor, which consists in exploding a combustible charge within a cylinder to move the piston therein, generating steam pressure by heat from the exploded charge, separating a portion of the steam from the main body thereof and directing a portion of the exploded charge thereinto to generate high pressure steam, admitting said high pressure steam into said cylinder, and retaining a portion to cooperate with the next explosive charge therein.

4. A method of generating power, which consists in exploding a combustible charge within a cylinder to apply power to a movable element, generating steam by the heat radiating from said cylinder, separating a portion of the generated steam from the main body thereof, and directing a portion of said combustible charge thereinto to generate high pressure steam and causing said high pressure steam with the rest of the burning charge to re-act against another movable element.

5. A method of generating power, which consists in exploding a combustible charge within a cylinder to apply power to a movable element, generating steam by the heat radiating from said cylinder, conducting a portion of this steam into a separate chamber and directing a portion of the combustible charge into said chamber to generate a higher pressure of steam therein, and causing said steam with the rest of the burning charge to re-act against a second movable element.

6. A method of generating power, which consists in exploding a combustible charge within a cylinder to apply power to a movable element, generating steam by the heat radiating from said cylinder, separating a portion of the generated steam from the main body thereof and directing a portion of said combustible charge thereinto to generate high pressure steam, conducting a portion of said high pressure steam back into said cylinder to scavenge it and conducting a portion of this steam to act upon a second movable element.

7. A method of generating power, which consists in exploding a combustible charge within a cylinder to apply power to drive a piston therein, generating steam by the heat radiating from said cylinder, conducting a portion of this steam into a separate chamber and directing a portion of the combustible charge into said chamber to generate a higher pressure of steam therein, conducting a portion of said steam into said cylinder on its way to a second cylinder to act in conjunction with the balance of said charge to drive a second piston, and a portion of said charge being trapped in said first cylinder to assist in driving its piston part way on its suction stroke.

8. In a motor, a water jacketed internal combustion cylinder, means for firing the charge in the cylinder, means for generating a pressure of steam by the action of heat radiating from said exploded charge into said jacketed water, means for subsequently injecting a portion of the fiery charge into the steam to raise its pressure, and means for admitting said raised steam pressure thus generated into said cylinder.

9. In a motor, a water jacketed internal combustion cylinder, means for firing the charge therein, means for generating a pressure of steam by radiation from the heat of said exploded charge, means for injecting a portion of the fiery charge in said cylinder into said steam to raise its temperature and pressure, means for admitting a portion of said steam pressure thus generated and raised into said cylinder, and means for retaining a portion of the steam pressure in the cylinder to drive its piston part way on its intake stroke.

10. In a motor, a water jacketed internal combustion cylinder, means for firing the charge in the cylinder, means for generating a pressure of steam by the action of a radiated heat from said exploded charge, means for separating a portion of the steam from that generated by radiation, means for injecting a portion of the fiery charge into the separated portion to raise its temperature, means for admitting a portion of said last mentioned steam thus generated into said cylinder, and means for subsequently admitting a cool explosive charge into the steam in said cylinder, whereby said steam is condensed, and a vacuum is thus created to assist the piston action to draw in and more completely fill the cylinder with said charge.

11. In a motor, an internal combustion cylinder, means for generating a pressure of steam by the action of heat from said cylinder, means for separating a portion of said steam from the rest of the body portion, means for acting on said separated portion to raise its temperature and pressure above that of said body portion, and means for directing said steam from said separated portion into said cylinder.

12. In a motor, an internal combustion cylinder, means for generating a pressure of steam by the action of heat from said cylinder, a main steam receptacle, a superheating chamber, means for permitting a portion of the fiery exploded gases to act upon said chamber to superheat the steam therein, and means for directing a portion of the steam from said chamber into said cylinder.

13. In a motor, an internal combustion cylinder, means for generating a pressure of steam by the action of heat from said cylinder, a main steam receptacle, a superheating chamber, means for admitting a portion of the exploded gases into said chamber to superheat the steam therein, and means for directing a portion of the steam from said chamber into said cylinder.

14. In a motor, an internal combustion cylinder, a piston in said cylinder, means for firing an explosive charge in said cylinder, means for generating a pressure of steam in a separate superheating chamber by action of the heat from said exploded charge, and means for directing said steam pressure into said cylinder upon the return of the piston from its explosion stroke.

15. In a compound motor, a steam generator, a main steam receptacle, a superheating chamber for the steam, an internal combustion cylinder, a cooperating low-pressure cylinder, and means controlled by the action of the engine for admitting the exploded gases from the first cylinder and also steam from said super-heater to said low pressure cylinder.

16. In a compound motor, a steam generator, a steam super-heating chamber, an internal combustion cylinder, a cooperating low-pressure cylinder, means controlled by the action of the engine for directing a portion of the burnt charge from said first cylinder to said chamber, and a portion of said charge from said first cylinder combined with steam from said super-heater to said second cylinder.

17. In a compound motor, a steam generator, a steam super-heating chamber, an internal combustion cylinder, means for directing a portion of the exploded charge to act upon and superheat the contents of said chamber, a low pressure cylinder both cylinders having cooperating power elements, and means controlled by the action of the engine for admitting the exploded gases from the first cylinder and also steam from said super-heater to said low-pressure cylinder.

18. In a compound motor, an internal combustion cylinder, a steam generator in proximity to said cylinder, a steam super-heating chamber in said generator, means controlled by the action of the engine for causing the exploded charge to superheat the steam in said chamber, a low-pressure cylinder both of said cylinders having cooperating power elements, and means controlled by the action of the engine for admitting the exploded gases from the first cylinder and also steam from said super-heater to said low-pressure cylinder.

19. In a compound motor, a steam generator, a superheating steam chamber located in said generator, a valve for controlling the admission of steam from said generator to said chamber, an internal combustion cylinder, means controlled by the action of the engine for admitting a portion of the exploded gases from said cylinder to said chamber, a cooperating low pressure cylinder, and means controlled by the action of the engine for admitting exploded gases from the first cylinder and also steam from said chamber to said low pressure cylinder.

20. In a compound motor, a steam generator, a superheating steam chamber located within the generator, a throttle valve and also an automatically actuated valve for controlling the flow from the generator to said chamber, an internal combustion cylinder, a cooperating low-pressure cylinder, and means controlled by the action of the engine for admitting the exploded gases from the first cylinder and also steam from said super-heater to said low-pressure cylinder.

21. In a compound motor, a generator, a superheating steam chamber located in said generator, means for admitting steam to the chamber when its pressure is less than that in the generator and preventing a high pressure of steam in the chamber from flowing back into the generator, an internal combustion cylinder, a cooperating low-pressure cylinder, and means controlled by the action of the engine for admitting a portion of the exploded gases from said first cylinder into said chamber, and also for admitting portions of said gases from said combustion cylinder and steam from said chamber to said low-pressure cylinder.

22. In a compound motor, a steam generator, a superheating steam chamber immersed in the contents of said generator, a single automatically actuated valve for admitting pressure from said generator to said chamber when greater than that in said chamber and closing when the pressure in the chamber is greater than that in the generator, an internal combustion cylinder, a cooperating low-pressure cylinder, and means controlled by the action of the engine for admitting a portion of the exploded gases from said first cylinder into said chamber, and also for admitting portions of said gases from said combustion cylinder and steam from said chamber to said low pressure cylinder.

23. In a compound motor, an internal combustion cylinder, a steam generator in proximity to said cylinder, a steam superheating chamber in said generator, a low-pressure cylinder, means controlled by the action of the engine for causing the exploded charge to superheat the steam in said chamber, both of said cylinders having cooperating power elements, and means controlled by the action of the engine for directing a portion of the exploded gases from the first cylinder to said chamber and a portion of said charge from said first cylinder combined with steam from said super-heater to said low-pressure cylinder.

24. In a compound motor, a steam generator, a superheating chamber for the steam, a valve for admitting steam from the generator to said chamber, an internal combustion cylinder, means for exploding a charge of gases in said cylinder, a cooperating low-pressure cylinder, and means controlled by the action of the engine for admitting the exploded gases from said cylinder and also steam from said super-heater to said low-pressure cylinder.

25. In a compound motor, a steam generator, a steam super-heating chamber, an automatically actuated valve for admitting steam to said superheater when the pressure therein is below that in said generator, an internal combustion cylinder, means for exploding a charge in said cylinder, a cooperating low-pressure cylinder, and means controlled by action of the engine for admitting the exploded gases from the first cylinder and also steam from the super-heater to said low-pressure cylinder to aid in driving the piston therein.

26. In a compound motor, a steam generator, a steam super-heating chamber, an automatically actuated valve for admitting steam to said super-heater when the pressure therein is below that in said generator, an internal combustion cylinder, means for exploding a charge in said cylinder to raise the steam pressure therein, a cooperating low-pressure cylinder, and means controlled by action of the engine for admitting a portion of the exploded gases from said combustion cylinder and also high pressure steam from said super-heater to said low-pressure cylinder to assist in driving the piston therein.

27. In a compound motor, a steam generator, a superheating chamber, an internal combustion cylinder, a cooperating low-pressure cylinder, means controlled by the action of the engine for directing a portion of the burnt charge from said first cylinder to said chamber to superheat the steam therein, a passageway for conducting burnt gases from the first to the second cylinder and also for conducting a portion of the burnt charge into said chamber, said passageway also conducting the generator steam from said chamber to said second cylinder, and a valve in said passageway controlling the flow of the burnt gases to said chamber and both the remaining burnt gases and the steam to said second cylinder the steam also in passing is caused to act upon said valve to prevent it from overheating.

28. In a compound motor, a steam generator, a super-heating chamber for the steam, an internal combustion cylinder, a piston in said cylinder, a cooperating low-pressure cylinder, a passageway for the generated steam communicating with both cylinders whereby a portion of the steam from said chamber is caused to enter and scavenge the first cylinder and assist in forcing its burnt charge over into the second cylinder, and a valve controlled by the action of the engine to close and trap a portion of said steam pressure in said first cylinder to assist in driving its piston part way on its suction stroke.

29. In a compound motor, an internal combustion cylinder, a low-pressure cylinder, an exhaust pipe leading from said latter cylinder, a coil in said pipe for pre-heating the water supply, a steam generator in proximity to said internal combustion cylinder, means for forcing water through said coil to said generator, a super-heater for the steam, a valve for controlling the admission of steam from said generator to said heater, and means for controlling the flow of steam from said heater to both of said cylinders, and means for automatically controlling the amount of water that shall be admitted.

30. In a compound motor, an internal combustion cylinder, a low-pressure cylinder, an exhaust pipe leading from said latter cylinder, a coil in said pipe for pre-heating the water supply, a steam generator in proximity to said internal combustion cylinder, means for forcing water through said coil to said generator, means for automatically controlling the amount of water that shall be admitted, a super-heater for the steam, a valve for controlling the admission of steam from said generator to said heater, means for conducting a portion of the exploded charge from said combustion cylinder into said superheater to raise the temperature of the steam therein, and means for controlling the flow of steam from said heater to said low pressure cylinder.

31. In a compound motor, an internal combustion cylinder, a low-pressure cylinder, an exhaust pipe leading from said latter cylinder, a coil in said pipe for pre-heating the water supply, a steam generator in proximity to said internal combustion cylinder, means for forcing water through said coil to said generator, a super-heater for the steam, a valve for controlling the admission of steam from said generator to said heater, means for controlling the flow of steam from said heater to both of said cylinders, and means for automatically controlling the amount of water that shall be admitted.

32. In a compound motor, an internal combustion cylinder, a low-pressure cylinder, an exhaust pipe leading from said latter cylinder, a coil in said pipe for pre-heating the water supply, a steam generator in proximity to said internal combustion cylinder, means for forcing water through said coil to said generator, means for automatically controlling the amount of water that shall be admitted, a super-heater for the steam, a valve for controlling the admission of steam from said generator to said heater, means for conducting a portion of the exploded charge from said combustion cylinder into said super-heater to raise the temperature of the steam therein, and means for controlling the flow of steam from said heater to said low-pressure cylinder.

33. In a compound motor, a steam generator, a super-heating chamber, a steam valve for controlling communication between said generator and chamber, an internal combustion cylinder, a low pressure cylinder, a carburetor for providing an explosive mixture for said combustion cylinder, means whereby the opening and closing of said carburetor also operates said steam valve, and means for conducting the steam from said chamber to said low pressure cylinder.

34. In a compound motor, a steam generator, a super-heating chamber, a steam valve for controlling communication between said generator and chamber, an internal combustion cylinder, a low pressure cylinder, a carburetor for providing an explosive mixture for said combustion cylinder and mechanically actuated means whereby the manual opening and closing of said carburetor also performs a like function on said valve, and means for conducting the steam from said chamber to said low-pressure cylinder.

35. In a compound motor, a steam generator, a superheating chamber, a throttle valve and a cooperating inlet valve for controlling the flow to and from said chamber, an internal combustion cylinder, a low-pressure cylinder for providing an explosive mixture for said combustion cylinder, means whereby the opening of said carburetor also opens said throttle valve to permit the inlet valve to function, and means for conducting the steam from said chamber to said low-pressure cylinder.

36. In a compound motor, a pair of internal combustion cylinders, a cooperating low-pressure cylinder, a steam generator, a steam super-heater communicating with said generator, means for firing charges in said combustion cylinders alternately and then conducting these charges into said low pressure cylinder, and means for also conducting steam from said super-heater to said low-pressure cylinder.

37. In a compound motor, a pair of internal combustion cylinders, a cooperating low-pressure cylinder, a steam generator, a steam super-heater communicating with said generator, means for firing charges in said combustion cylinders alternately and then conducting these charges into said low pressure cylinder, and means for conducting steam from said super-heater alternately through said combustion cylinders to said low-pressure cylinder.

38. In a compound motor, a pair of internal combustion cylinders, a cooperating low pressure cylinder, a steam generator, a steam super-heater communicating with said generator, means for firing charges alternately in said combustion cylinders and then conducting a portion of each of these charges into said super-heater and portions into said low pressure cylinder, and means for also conducting steam from said super-heater to cooperate with said burnt charges and enter said low pressure cylinder.

39. In a compound motor, a pair of internal combustion cylinders, a cooperating low pressure cylinder, a steam generator, a steam super-heater communicating with said generator, means for firing charges alternately in said combustion cylinders and then conducting a portion of each of these charges into said low-pressure cylinder, portions of said charges also entering said super-heater and at widely separated points, and means for also conducting steam from said super-heater to cooperate with said burnt charges and enter said low pressure cylinder.

In testimony whereof I affix my signature.

ARTHUR V. DA COSTA.